July 16, 1929.  T. DE KONING  1,721,375
METER TESTING APPARATUS
Filed Nov. 3, 1925
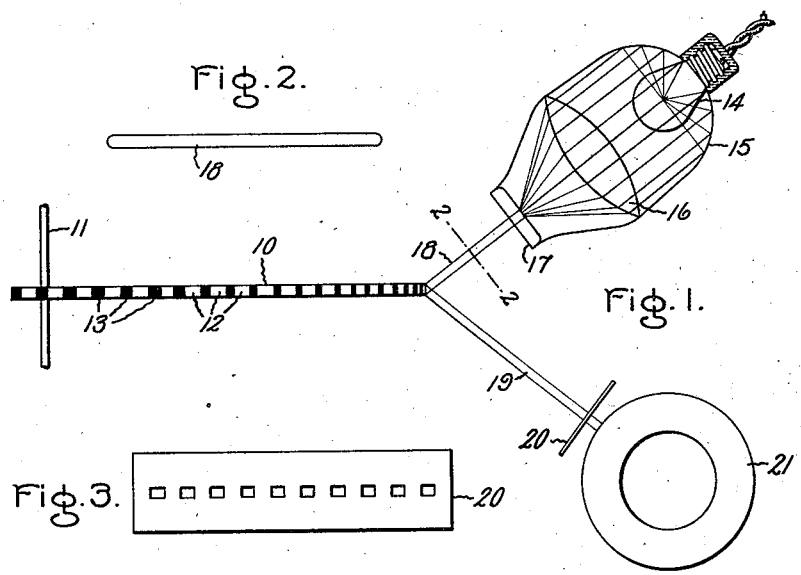
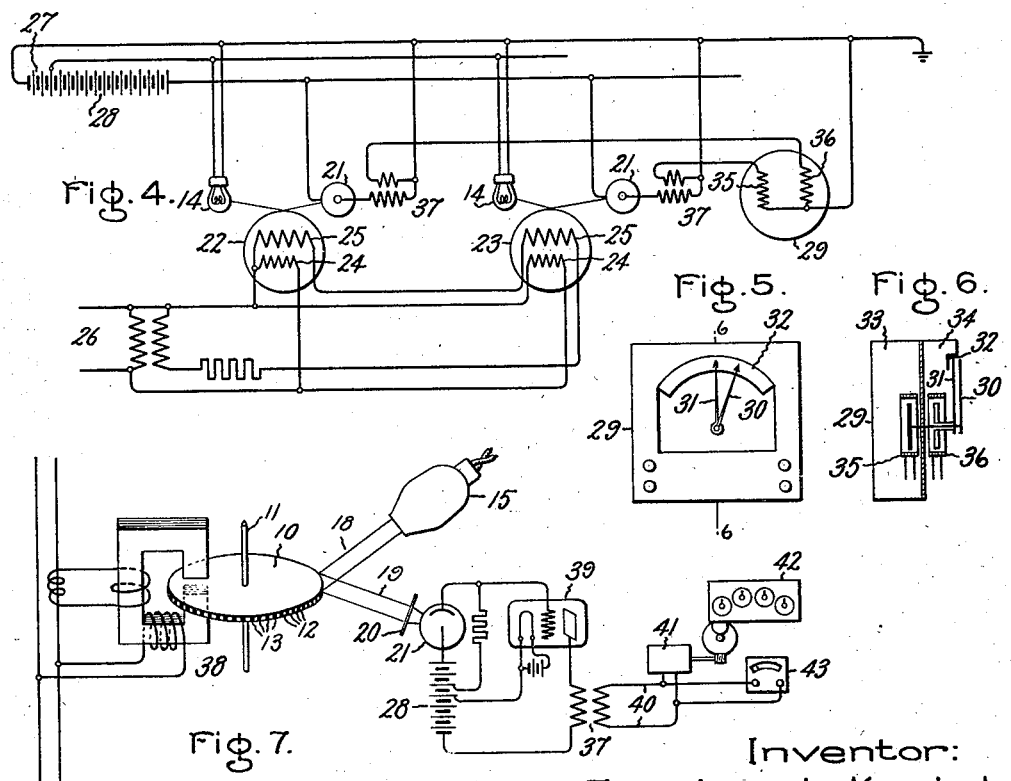
Inventor:
Theodoor de Koning,
by Alexander S. Smith
His Attorney.

Patented July 16, 1929.

1,721,375

UNITED STATES PATENT OFFICE.

THEODOOR DE KONING, OF BROOKLYN, NEW YORK, ASSIGNOR TO GENERAL ELECTRIC COMPANY, A CORPORATION OF NEW YORK.

METER-TESTING APPARATUS.

Application filed November 3, 1925. Serial No. 66,672.

My invention relates to telemetric apparatus and although not limited thereto is particularly advantageous for the testing of integrating meters.

It is the general practice in testing watthour meters to compare the speed of the meter being tested with a standard watthour meter by counting the revolutions of the meters over a given period when they are subject to the same load. This method of testing has the disadvantage of not being able to compare the instantanous speeds of the two meters and makes check readings necessary while the accuracy of the test is limited by the duration of the testing period. It is one of the objects of my invention to provide a method of and apparatus for testing integrating meters by instantaneous comparisons of their speeds.

In carrying my invention into effect I make use of photo electric cells or equivalent devices to generate pulsating or alternating currents proportional to the speed of the meters and then compare the meter speeds by comparing the frequencies of the generated currents.

The features of my invention which are believed to be novel and patentable will be pointed out in the claims appended hereto. For a better understanding of my invention reference is made in the following description to the accompanying drawing in which Fig. 1 shows the general method which I employ of influencing a photo electric cell or other light sensitive device in proportion to the speed of a rotating body; Fig. 2 shows the general cross-sectional shape of the band of light which is directed on to the rotating body in Fig. 1; Fig. 3 is a face view of the light screen shown in Fig. 1; Fig. 4 shows the electrical connections for a meter testing equipment embodying my invention; Figs. 5 and 6 are different views of an instrument for comparing frequencies; and Fig. 7 illustrates the use of my invention for general telemetric purposes.

Referring to Fig. 1 of the drawing, 10 represents the usual disc of an induction watthour meter and 11 the shaft. The periphery of the disc is provided with a large number of equally spaced alternate light and dark sections 12 and 13 respectively. This effect may be produced by polishing the periphery of the disc and painting on dark sections with a suitable paint. A large number of discs may be stacked together and be prepared in this way simultaneously at small cost. A light source represented at 14 cooperating with a suitable reflector 15, condensing lens 16 and screen 17 is provided to produce a band of light 18 of the general cross-sectional shape shown in Fig. 2, Fig. 2 representing a cross-section taken on line 2—2. This band of light is directed on the periphery of the disc 10 and a plurality of narrow bands of light 19 are reflected by the light sections 12 of the disc through a screen 20 on to a photo electric cell 21. The screen 20 has a plurality of windows or openings of the same general spacing as the plurality of bands of light 19 directed thereon. It will be seen that as the disc 10 rotates the plurality of bands of light 19 will sweep across the screen 20 and will be alternately intercepted and allowed to pass through the screen to the photo electric cell as they pass the alternate solid and open portions of the screen. The periodicity of the light rays striking the cell will be proportional to the speed of disc 10 while the volume of such light will be considerable and of a constant brightness as it strikes the cell.

It is known that the resistance of a photo electric cell to the passage of electric current is inversely proportional to the light to which the cell is subjected and I make use of this phenomenon to generate current impulses having a frequency proportional to the speed of the disc. Various other arrangements of the apparatus than that shown in Fig. 1 may be used to accomplish the desired result.

Fig. 4 illustrates appropriate electrical connections for employing this feature of the invention for the testing of integrating watthour meters. 22 may be considered a standard watthour meter and 23 a watthour meter to be tested by comparing its speed and load with meter 22. For the purpose of maintaining the load on the two meters the same their potential coils 24 are connected in parallel and their current coils 25 in series and they are energized from an appropriate source of supply 26, as is the usual practice. While I have here specified electric watthour meters, this is for the purpose of illustration only, since it will be evident that the meters 22 and 23 might be any two rotating bodies the relative speeds of which it is desired to compare. 14 represents the light sources and 21 the photo electric cells arranged with respect to the rotating parts of the two meters as explained in connection with Fig. 1. The lamps 14 may be supplied from a low voltage source 27 and the cells may be connected across a direct current source 28 of sufficiently high voltage to assure their successful operation. 29 is a frequency comparer which may comprise two standard frequency meters built as shown in Figs. 5 and 6 so that their pointers 30 and 31 indicate on the same scale 32.

Fig. 6 represents a cross-section taken on section 6—6 of Fig. 5 showing how the two frequency meters may be placed in separate compartments 33 and 34 with their indicating shafts coaxially arranged one inside the other. The coils 35 and 36 of the frequency meters are indicated in the electrical diagram of Fig. 4 by corresponding reference characters.

It will be understood that as the meters 22 and 23 rotate direct current impulses will be allowed to pass through the cells 21 and that the frequency of these impulses will be proportional to the speeds of the corresponding meters. Transformers 37 are provided with their primaries respectively connected in the circuits of the cells 21 and with their secondaries respectively connected in series with the coils 35 and 36 of the frequency comparer 29. In this way the direct current impulses produced by the cells are converted into alternating currents of corresponding frequency and operate the two parts of the frequency comparer so that pointer 30 indicates the instantaneous speed of meter 22 while pointer 31 indicates the instantaneous speed of meter 23 whereby any difference in such speeds may be directly observed at any and all loads. The common scale of the two frequency meters may be calibrated in per cent error, R. P. M. or in KW, or any other units desirable. It is of course important that the two frequency meters be checked beforehand to see that they have the same calibration. It will be noted that this method of indicating speed imposes no load whatever on the rotating meters and that their loads may be changed without interfering with the speed comparing means. In practice any number of meters may be in the process of warming up under load and as their operation becomes constant they may be shifted along with respect to the photo electric apparatus and their speeds instantly compared with the standard under various desired load conditions. Cumbersome methods of counting involving the human element are eliminated and no computation is necessary in order to determine the error of a meter since the error, if any, may be directly observed.

In Fig. 7 I have illustrated my invention as applied to the transmission of the integrations of a meter to a distant point. Here the watthour meter represented at 38 is provided with the photo electric frequency producing apparatus previously described. In cases where it is necessary, the direct current impulses may be amplified by the amplifier shown at 39 before being transformed to alternating current by the transformer 37. This alternating current may then be transmitted any distance over a circuit 40 to operate a self-starting synchronous motor 41 which is suitably geared down to an ordinary integrating dial 42 calibrated to reproduce the integrated measurement of meter 38. The instantaneous values measured by the watthour meter may also be obtained by a frequency meter 43 calibrated in watts.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. The method of simultaneously comparing the speeds of movement of two devices which consists in photoelectrically generating current impulses having frequencies proportional to the respective rates of movement of said devices converting said impulses into alternating currents and comparing the frequencies of said alternating currents by measurement on a common scale.

2. In combination, a light source, a light sensitive cell, a movable member having a surface arranged to intermittently reflect light rays from said source on to said cell as the member is moved, an electric circuit associated with said cell in which current impulses are produced by the action of light on said cell, means for changing said current impulses to an alternating current, and means calibrated to indicate the rate of movement of said movable member for measuring the frequency of such alternating current.

3. Apparatus for testing integrating meters comprising a plurality of such meters, a light sensitive cell for each meter, means for intermittently exposing said cells to light at intervals respectively proportional to the speeds of said meters, means responsive to the intermittent action of light on said cells for producing alternating currents having frequencies respectively proportional to the speeds of said meters, and means responsive to such alternating currents for directly indicating any difference in the speeds of said meters.

4. Apparatus for testing integrating meters comprising a pair of such meters, means for producing alternating currents having frequencies respectively proportional to the speeds of said meters, said means comprising photoelectric current generating apparatus which imposes no friction upon said meters, and means responsive to such currents for continuously indicating any difference in the instantaneous speeds of said meters.

5. In a metering system embodying an integrating meter, a light source, a light sensitive cell, means rotating with said meter for directing a plurailty of substantially equally spaced bands of light from said source toward said cell, said bands of light moving with the rotation of the meter, and a screen adjacent said cell having windows spaced to correspond to the spacing of said light bands for intermittently intercepting said light bands as they sweep thereacross.

6. In a metering system embodying an integrating meter having a rotary surface concentric with the axis of rotation of said meter, said surface having a plurality of alternate light reflecting and light absorbing sections peripherally arranged and approximately equally spaced, a stationary light source for directing a band of light upon a plurality of said light reflecting sections as the meter rotates, a light sensitive cell toward which a plurality of bands of light are reflected from said light reflecting surfaces, and a screen between said surfaces and cell having windows spaced approximately the same as the reflected bands of light thereat, whereby said light bands are alternately intercepted and allowed to pass to the cell as they sweep across said screen.

In witness whereof I have hereunto set my hand Oct. 31st, 1925.

THEODOOR de KONING.